United States Patent [19]

Hunter

[11] 4,169,529

[45] Oct. 2, 1979

[54] ITEM TRANSPORT APPARATUS COMPRISING A VARIABLE THICKNESS CARRIER DEVICE

[75] Inventor: James R. Hunter, Chadds Ford, Pa.

[73] Assignee: Burroughs Corporation, Detroit, Mich.

[21] Appl. No.: 881,241

[22] Filed: Feb. 27, 1978

[51] Int. Cl.² .............................................. B65G 37/00

[52] U.S. Cl. .................................... 198/473; 198/648; 198/656; 198/715; 24/3 F

[58] Field of Search ............... 198/350, 473, 648, 655, 198/656, 678, 715; 214/1 M; 224/1 A, 4 B, 5 A, 5 B, 5 Q, 12, 22, 23, 26 K, 33 R, 33 A, 42.46 A, 49, 58, 5 R; 24/3 R, 3 E, 3 F

[56] References Cited

U.S. PATENT DOCUMENTS

| | | | |
|---|---|---|---|
| 2,271,262 | 1/1942 | Johnson | 224/5 A |
| 3,884,370 | 5/1975 | Bradshaw et al. | 198/350 |

*Primary Examiner*—Joseph E. Valenza

*Attorney, Agent, or Firm*—Francis A. Varallo; Leonard C. Brenner; Kevin R. Peterson

[57] ABSTRACT

Item transport apparatus is described which finds particular application in a system for transporting and processing a variety of items or articles including mail pieces of the letter or flat variety. The processing of such items may entail the sorting, compact storing and retrieving thereof. In contrast to present day item transport apparatus in which the carrier devices themselves require an excessive volume to store the items being processed, the carrier of the invention retains the item in a sleeve of relatively thin semi-rigid material which adjusts substantially to the thickness of the item. Accordingly, depending upon the item itself, the overall thickness of the loaded carrier may be little more than that of the item and the storage efficiency is optimum.

10 Claims, 6 Drawing Figures

Fig. 1
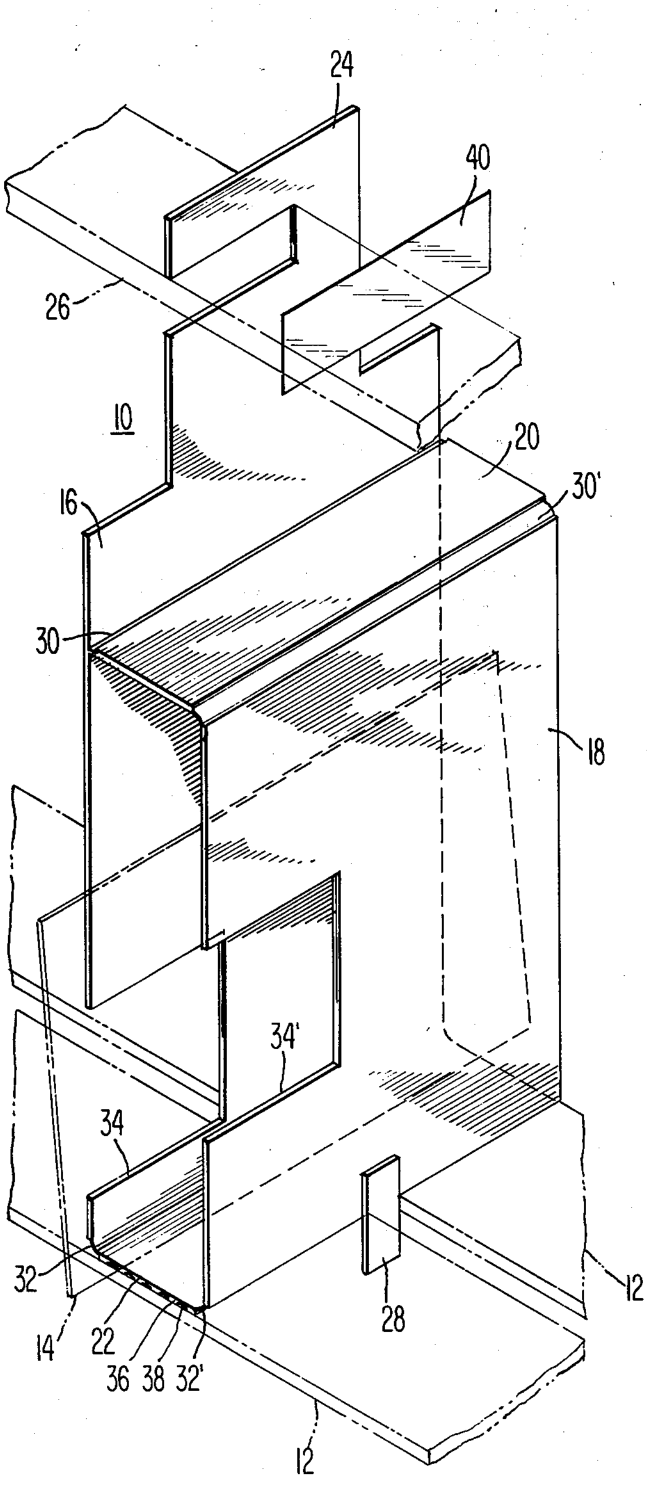
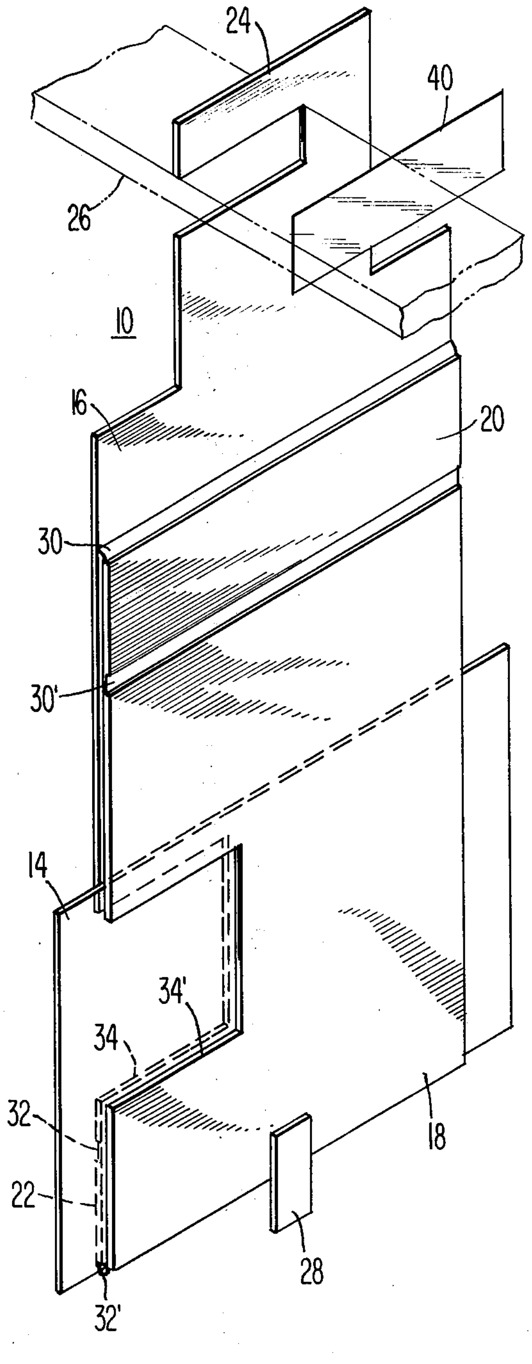
Fig. 4

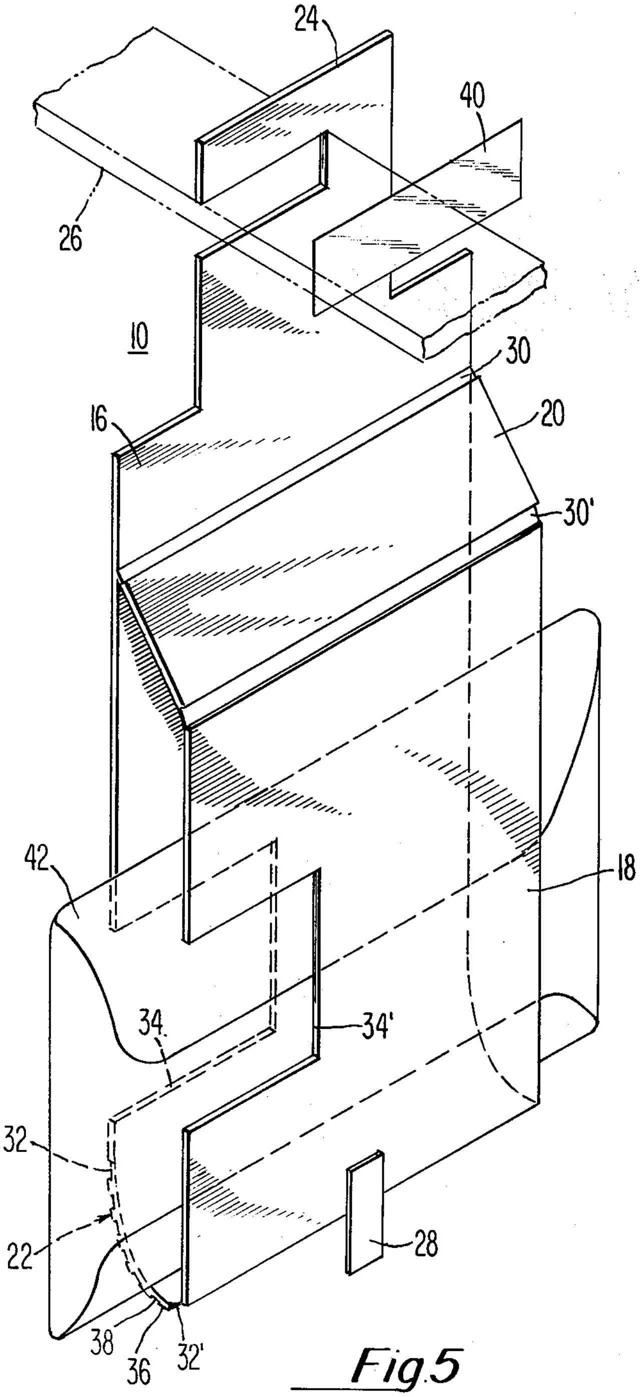
Fig.5
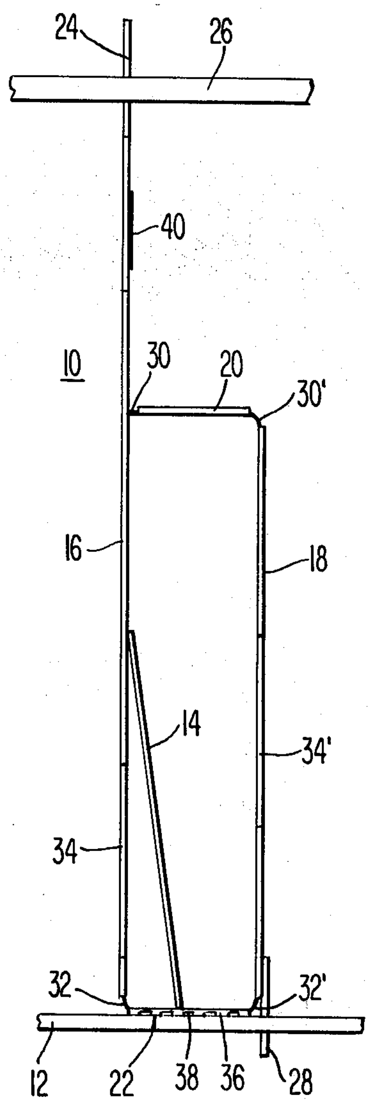
Fig.2
Fig.3
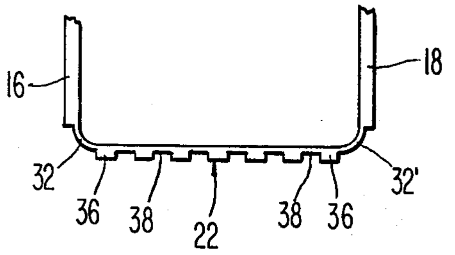

ITEM TRANSPORT APPARATUS COMPRISING A VARIABLE THICKNESS CARRIER DEVICE

CROSS REFERENCE TO RELATED APPLICATIONS

The carrier of the present invention finds specific utility in the "System for Sorting and Processing Articles Including Flat Mail Pieces", which was filed as Ser. No. 401,954 in the names of Robert S. Bradshaw et al. and issued as U.S. Pat. No. 3,884,370. A detailed description of an "Item Transport Apparatus" for use in the above system was filed as Ser. No. 544,296 in the names of Joseph C. Carbine et al and issued as U.S. Pat. No. 3,960,264. Both of the foregoing patents are assigned to the same assignee as the present application.

BACKGROUND OF THE INVENTION

In the above referenced patents, respective carrier designs are described. In U.S. Pat. No. 3,884,370, the carrier comprises a lower section having means for clamping one of the items to be transported and a T-shaped upper section having a spring-loaded clamp release lever protruding therefrom and connected to the clamping means in the lower section. In the carrier described and claimed in U.S. Pat. No. 3,960,264, the clamping means comprises a plurality of gripping levers so arranged that they are automatically adjustably movable as a result of the pendulum effect or tilt of the item being transported. This effect causes the item to move into a tighter engaging position in the carrier with each tilt or swing. Release means are coupled to said levers for removing the item therefrom.

While the foregoing carrier concepts are quite sound and have been demonstrated to work effectively in mail processing applications, they have a common major shortcoming. That is, they require an excessive amount of physical space or volume to store a large quantity of documents. This condition limits the size of systems that can be configured utilizing these carrier concepts. The methods used to clamp and release documents from these carriers account in large measure for the space occupied thereby.

By way of example, the carrier described in the reference U.S. Pat. No. 3,960,264 is approximately 1.125 inches thick in the direction of travel and storage. On the other hand, its maximum document thickness handling capability is only 0.5 inches. Therefore, its storage efficiency in this case is 44 percent. The problem of wasted storage space becomes even more evident when the carrier transports a document having an average thickness of 0.150 inches. The storage efficiency falls to 13 percent.

The carrier of the present invention eliminates the aforementioned poor storage volume efficiency and is therefore especially useful for large scale applications.

SUMMARY OF THE INVENTION

In accordance with the present invention, the carrier is comprised of a modified four-bar linkage arrangement of material having a minimal thickness capable of supporting the document being transported. In its physical orientation on the transport means which supports it, the carrier resembles a sleeve having a pair of vertical side members in substantial parallel orientation. One side member is fixed; the other is movable. The fixed side member includes a hanger element for engaging the transport means. The upper portion of the fixed side member below said hanger element is joined to the upper extremity of the movable side member by an upper support section which is hinged at the respective junctions with the side members. Similarly, the lower extremities of both side members are coupled to each other by a lower support section, connected in hinged relationship to each side member. Advantageously, as will be considered hereinafter, the lower support section may be formed by a plurality of narrow slats hinged together to form a flexible base.

In operation, when the carrier is empty and is permitted to hang freely from the transport, the linkage is closed, and the two side members lie in contiguous parallel planes. The overall thickness of the unloaded carrier in the direction of transport travel is approximately twice the thickness of the material of one of the side members. When it is desired to insert an item into the carrier, the lower extremity of the movable side member, and the lower support section, are displaced upward. The fixed side member remains stationary, while the movable side member moves upward and outward from the fixed member, while maintaining its parallel relationship therewith. When the lower support member becomes horizontal, the upper section is similarly oriented and the carrier assumes a rectangular configuration. A document may be easily inserted in the open carrier. When this has been accomplished, the lower portion of the carrier is permitted to hang freely, causing the carrier side members to collapse toward each other. The bottom support section of the carrier contacts the lower extremity of the document being transported, while depending upon the thickness and contour of the document, the side members tend to remain in substantial parallel alignment to engage at least a portion of the sides of the document. Subsequent removal of the document from the carrier after storage, involves at least the partial opening of the carrier linkages as described hereinbefore.

A significant improvement in volume efficiency is provided by the present invention. Assuming that the side members are each 0.030 inches thick and depending upon the document contour, the loaded carrier may be only 0.060 inches thicker than the document it is transporting. For example, the efficiency for an average 0.150 inch document is 71 percent. As compared to efficiencies using present day item carriers of the type described in the reference patents, the present carrier allows for a greatly increased storage capability within the size constraints of a given piece of equipment.

These and other features of the invention will become more fully apparent in the detailed description of the item transport apparatus and its mode of operation, which follows:

BRIEF DESCRIPTION OF THE DRAWING

FIG. 1 is a pictorial view of the variable thickness carrier of the present invention as it appears when fully opened and ready to receive the item to be transported.

FIG. 2 is an end view of the carrier of FIG. 1 to better illustrate the rectangular opening of the fully opened carrier and the slatted structure of the carrier bottom support section.

FIG. 3 is an enlarged view of the flexible slatted support section.

FIG. 4 is a pictorial view of the carrier as it appears in a closed condition when transporting a letter.

FIG. 5 is a pictorial view of the carrier as it appears in a closed condition when transporting a bulky mail flat.

DESCRIPTION OF THE PREFERRED EMBODIMENT

Figure 6:
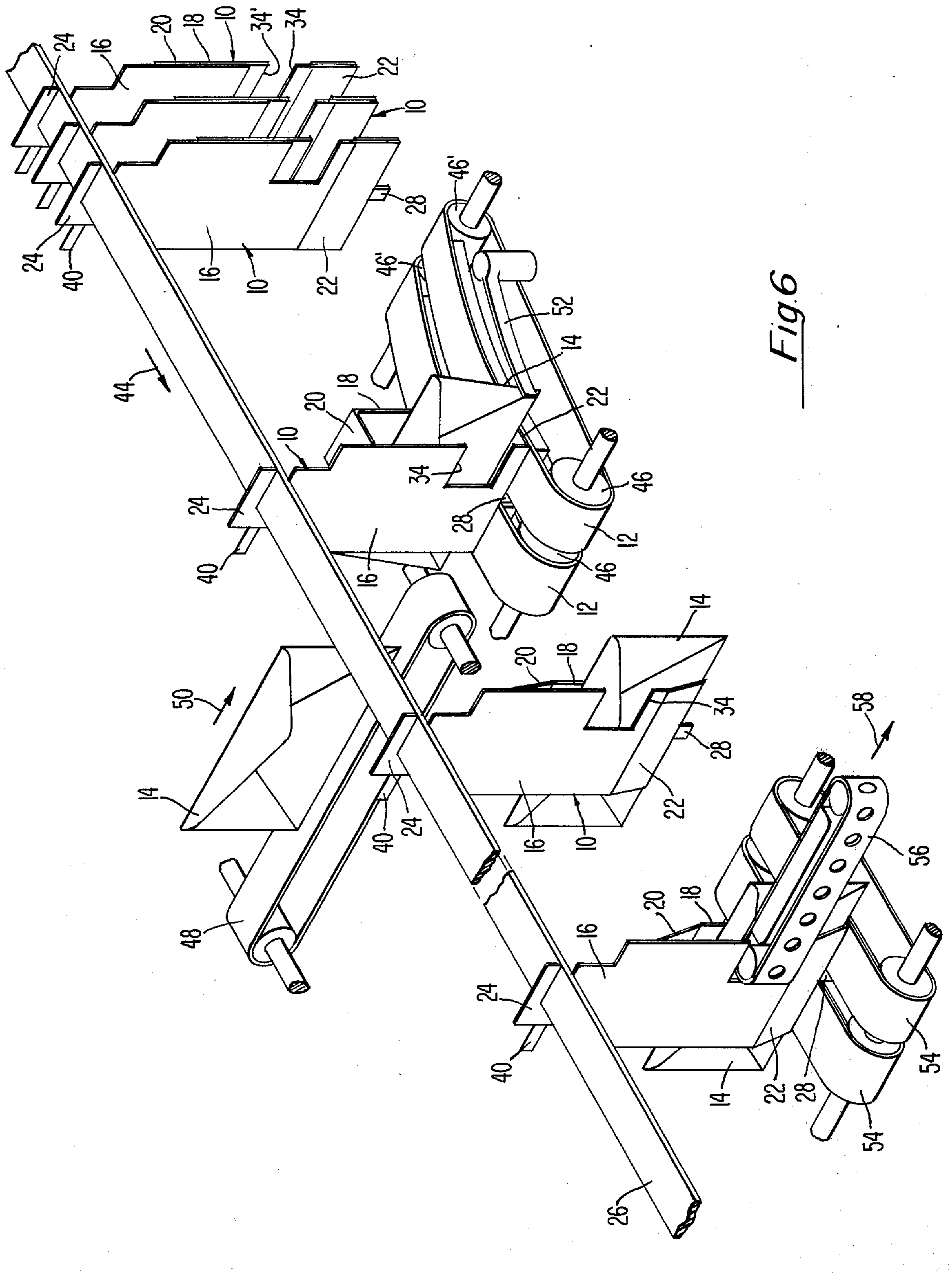
FIG. 6 illustrates in simplifed form, item transport apparatus including means for loading and unloading carrier devices of the type depicted in FIGS. 1–5.

With reference to FIG. 1, there is illustrated a carrier 10 as envisioned by the present invention. The carrier 10 is shown in a fully opened condition as effected by the action of carrier loading opener belts 12, which action will be considered in detail in connection with FIG. 6. It is sufficient to observe at this time that in the open position, the carrier is ready to receive the document 14 or other item to be transported.

In construction, the carrier 10 comprises a modified four-bar linkage arrangement and includes a fixed side member 16, a movable side member 18, an upper support section 20 and a lower support section 22. The fixed side member 16 contains at its upper extremity a slotted hanger-like element 24 for engaging the transport means belt 26, which supports it. The movable side member 18 includes a tongue-like element 28 which projects downward from the midpoint of its lower extremity. This latter element 28 serves to stabilize the carrier 10 during loading and unloading operations as described hereinafter.

The modified four-bar linkage configuration is manifested in the hinged couplings along lines 30 and 30' where the upper support section 20 joins the respective side members 16 and 18. Additionally, the respective lower extremities of side members 16 and 18 are joined to each other by lower support section by hinged couplings along lines 32 and 32'. The linkage configuration provides that the side members 16 and 18 will lie in substantially parallel planes, either spaced-apart from each other when the carrier is fully open as in FIGS. 1 and 2, or approximately contiguous to each other as in FIG. 4, when the carrier is fully closed and empty or is transporting a thin or average thickness document. With regard to the transporting of thick documents, the planes in which the carrier side members lie may be parallel, as in FIG. 5, or skewed, depending upon the document dimensions and its contour.

Both side members 16 and 18 contain respective openings 34 and 34' along a vertical edge thereof. These openings appear displaced in a vertical sense, as seen in FIG. 1, when the carrier is held open, but tend to lie opposite each other when the carrier is closed and is transporting a document, as in FIG. 4. The openings serve to facilitate the removal of the documents during the unloading operation, as will be described in connection with FIG. 6.

The carrier 10 itself may be constructed of a variety of materials utilizing well-known fabrication techniques. For example, the entire carrier 10, including the hinge profiles along the lines 30, 30' and 32, 32', may be molded in one piece of a plastic material, such as polypropylene. Alternately, the plastic carrier may be formed in two or more pieces and bonded together to form a unitary device. Still another construction approach involves thin sheets of metal, such as aluminum, with the hinge elements being provided by polypropylene material bonded to the aluminum members. Accordingly, it should be apparent that the present invention is not limited to a specific carrier fabrication technique. For purpose of description, the carrier 10 illustrated in the drawing may be regarded as having been constructed in one piece of plastic material.

Thus far, the actual construction of the lower support section 22 has not been considered. With continued reference to FIG. 1 and more specific reference to FIGS. 2 and 3, it may be seen that the lower support section 22 is advantageously comprised of a plurality of slats 36 connected to each other along their lengths by thin flexible material 38. In a polypropylene construction, the relatively thick slats are each necked down along their lengths to connect to the next adjacent slat. The slatted construction of the lower support section ensures that the carrier 10 will close into the most compact spacing, when the item being transported is relatively bulky. The action of the slats in achieving an optimum carrier packing density will be considered hereinafter in connection with FIG. 5.

A flag-like member 40 is attached to and lies substantially in the same plane as the fixed side member 16 of the carrier 10. The former member may have a magnetizable surface for carrying a coded legend or magnetic information concerning the handling and movement thereof in accordance with well-known magnetic techniques as described in the aforementioned reference U.S. Pat. No. 3,884,370. It should be understood that the flat 40 may utilize information bearing techniques other than magnetics. For example, a photo-reflector or photo-transparent system could be employed where each carrier would contain a unique signature code on the flexible flag 40.

In FIG. 4, the carrier is shown transporting a letter 14. The movable side member 18, as well as the upper and lower support sections 20 and 22 have pivoted downward due to the weight of these parts and the letter. The bottom edge of the letter 14 lies within the closure along hinge line 32' and the face surfaces of the letter are gently squeezed between the side members 16 and 18. If it is assumed that the thickness of the material in each side member is approximately 0.03 inches and the letter is 0.150 inch thick, the total thickness of the loaded carrier is only 0.210 inches.

FIG. 5 depicts the carrier contour when the carrier is loaded with a bulky item such as a mail flat 42. The thickness of such a document may be a maximum of 0.50 inches. After the flat 42 has been inserted into the open carrier of FIG. 1, the carrier is permitted to close. The flat drops down and contacts the slatted lower support section 22 and at least respective portions of its face surfaces tend to be squeezed gently between the carrier side members 16 and 18. As seen clearly in FIG. 5, the bottom edge of the flat rests upon a number of slats and the remaining slats curve around the contour of the back face surface of the flat 42, acting like an extension of the fixed side member 16. It should be apparent that the slatted lower support section 22 performs a necessary function when the items to be transported are relatively thick in that the document extremity tends to position itself near the hinge line 32' which defines (except for the tongue-like member 28) the lowest point of the carrier 10. This in turn, results in an optimum minimal separation of the side members 16 and 18. If the section were a rigid member, rather than flexible as a result of the plurality of slats 36, a document such as the maximum thickness flat 42 described above would prevent the carrier from closing to the optimum thickness achieved with the slatted section 22. This condition results from the fact that as the carrier attempts to close and the opening at its lowest extremity assumes a "V" configuration, the weight of the flat will try to drive it down to the carrier's lowest pivot point at line 32'. Since the extremity of the flat 42 cannot occupy this point, the angle defined by the "V" enlarges to accommodate the thickness of the flat, causing the side members 16 and 18 to move away from each other and out of the contact with the face surfaces of the flat. The distance between the side members under this condition may be non-uniform thereby destroying the carrier's efficiency. For thin and average documents, such as letter 14 (FIG. 4), the condition is not so severe, and operation of the carrier with a non-slatted lower support section is feasible.

The loading and unloading of the carriers 10 of the type depicted in FIGS. 1-5 are shown in FIG. 6. A plurality of empty carriers 10 are shown suspended from a moving transport belt 26 by their respective hanger elements 24. As noted hereinbefore, when the carrier is empty, the four-bar linkage is closed and the carrier thickness is twice the thickness of the vertical side walls. In an actual embodiment, this total thickness is approximately 0.060 inches. As an empty carrier 10 advances in the direction of the arrow 44, the movable side member 18 and lower support section 22 thereof contact a pair of moving carrier opener belts 12. These latter belts are oriented in a spaced apart side-by-side relation. Additionally, through the use of drive pulleys 46 and 46' of different diameters, the belts slope upward toward the transport belt in the direction of travel of the carriers. As the movable side member 18 is pivoted upward by the loading opener belts 12, the carrier begins to open into a rectangular form. When the carrier is fully open, as seen in FIGS. 1 and 2, the transport belt 26 and loading opener belts 12 are stopped. The width of the carrier rectangle as seen in FIG. 2 is sufficient for easy insertion of the document 14 therein. The latter is accomplished by a document insertion belt 48, which is oriented at right angles to the transport belt 26. For higher throughput operation, the transport belt 26 and loading opener belts 12 may be allowed to continue moving during the document insertion process. The speed of the document insertion belt 48 would then be adjusted with respect to the speed of the transport belt 26 and loading opener belts 12 to insure that a document will be delivered to the open carrier as it passes the insertion belt 48. The document is then advanced into the carrier in the direction of arrow 50 until it contacts an adjustable stop gate 52. If the length of the documents 14 to be carried at a given time is known, the gate may be set at a predetermined stop to insure that the document will be approximately centered in the carrier. Alternately, while not shown in FIG. 6, the length of the document may be measured as it advances toward the carrier by a series of photo-detectors. Logic circuit means may then be utilized to interpret the electrical signals from the detectors and to set the correct position of the stop gate 52. The tongue-like element or projection 28 at the lower extremity of a carrier enters and remains in the space between the loading opener belts 12. The projection 28 stabilizes the carrier and insures that the carrier 10 remains vertical during the document insertion process.

When the carrier has been loaded, the transport belt 26 and loading opener belts 12, if previously stopped, are again set in motion and the carrier advances off the latter belts. With support of the carrier removed, the carrier attempts to reclose to its flat condition as seen in FIG. 4. The closing of the carrier linkages takes place because of the weight of the document 14 and that of the movable side member 18. If desired, the closing force may be increased by means of a spring or thin flexure (not shown), although this is not considered necessary in most applications. As described hereinbefore, the document is held securely by virtue of its lower extremity being grasped by the lower support section 22, and its face surfaces contacting the side members 16 and 18. Addition of a spring closure would further increase the grip on the document surfaces.

After leaving the loading belts 12, the carrier 10 may be directed to storage locations as specified by the information contained on its flag-like member 40. The reading of the information is accomplished in a conventional manner as it passes a read/write station (not shown). After storage, the carrier is transported to an unloader station which comprises a pair of carrier unloading opener belts 54. These belts are spaced apart in side-by-side relation. While similar to the loading opener belts 12 described earlier, they do not slope upward. Instead, they are disposed a predetermined distance below the transport belt, and serve to raise the movable side member 18 and lower support section 22 of the carrier just enough to loosen its grip upon the document 14. At this point, the document is contacted by a moving vacuum remover belt 56 which moves it out of the carrier in the horizontal direction of arrow 58 as seen in FIG. 6. The openings 34 and 34' in the respective side members 16 and 18 of the carrier permit both the easy removal of the document and clearance for the vacuum belt 56 as the now empty carrier proceeds off the ends of the unloader belts 54. It should be noted that by controlling the velocities of the transport belt 26 and the vacuum unloader belt 56, the documents may be removed in single file or in shingled fashion.

In addition to the storage volume efficiency provided by the present invention, the need to elevate documents for top edge registration to enter the carriers described in the reference patents, is eliminated. In a system utilizing the present carriers, the documents enter and leave the carrier with bottom edge registration. Therefore, the previous associated mechanisms used to elevate documents by varying amounts, depending on document height, in order to insert them into the carrier are not required.

In conclusion, a variable thickness carrier has been described which is especially useful in the large scale transporting and storage of items. While the previous description has been concerned with a mail handling application, it should be understood that the present invention has utility in other and different applications. For example, the present carrier has application in the handling of other items and materials, such as books, cardboard sections, sheet metal, plastic, glass, etc, which is to be transported, or stored for further processing or handling. Changes and modification of the carrier device may be needed to suit the particular requirements of such applications. Such changes and modification insofar as they are not departures from the true scope of the invention are intended to be covered by the following claims.

What is claimed is:

1. Apparatus including transport means for transporting items including mail pieces comprising:

carrier means;

said carrier means having a fixed side member, a movable side member and a pair of support sections;

said fixed side member having a hanger-like element at one extremity thereof for engaging said transport means;

a first pair of hinge means coupling a first of said support sections respectively to said fixed side member and one extremity of said movable side member;

a second pair of hinge means coupling the second of said support sections respectively to the other opposite extremities of both said fixed side member and said movable side member, said second of said support sections being comprised of a plurality of slats connected to one another along their lengths by flexible material;

said first and second pair of hinge means being operatively disposed on said carrier means for enabling the latter to selectively assume at least a fully closed and a fully open configuration;

said fully closed configuration being comprised of said fixed side member and said second of said support sections lying substantially in a first plane, and said movable side member and said first of said support sections lying in a second plane substantially parallel to and contiguous with said first plane;

said fully open configuration being comprised of said fixed side member and said movable side member lying in respective parallel planes and being spaced apart by said first and said second support sections lying respectively in planes substantially transverse thereto, said fully open configuration permitting the reception by said carrier means of said items to be transported;

said carrier means assuming a configuration intermediate said fully open and said fully closed configuration when transporting said items, the geometries of the intermediate configurations varying as a function of the thickness and contour of said items.

2. Apparatus as defined in claim 1 further characterized in that said fixed side member and said movable side member include along homologous portions thereof openings which are displaced in a vertical sense when said carrier means is in said fully open configuration and are substantially opposite each other in a horizontal sense when said carrier means is in said intermediate and fully closed configurations.

3. Apparatus as defined in claim 2 wherein said transport means comprises a substantially horizontal moving belt, said hanger-like element having a slot for engaging said last mentioned belt, said carrier means being disposed in a vertical plane when carried thereby.

4. Apparatus as defined in claim 3 wherein said other opposite extremity of said movable side member includes a tongue-like element projecting outward in substantially the same plane as said last mentioned side member.

5. Apparatus as defined in claim 4 further including a pair of carrier loading opener belts oriented in spaced-apart side-by-side relation, said carrier loading opener belts being positioned below the transport means belt and being sloped upward and moving in the direction of travel of said last mentioned belt, said carrier means movable side member and said second of said support sections contacting said carrier loading opener belts and being displaced upward, thereby effecting said carrier means fully open configuration.

6. Apparatus as defined in claim 5 further including a document insertion belt positioned on one side of said carrier opener loading belts and oriented transverse thereto for inserting a document into said carrier means when the latter is in said fully open configuration, said carrier means tongue-like element being disposed in the space between said carrier loading opener belts to stabilize said carrier means in a vertical plane during the document insertion process.

7. Apparatus as defined in claim 6 further including a pair of carrier unloading opener belts oriented in spaced-apart side-by-side relation, said carrier unloading opener belts being positioned on a horizontal plane at a predetermined distance below the transport means belt and moving in the direction of travel of said last mentioned belt, said carrier means movable side member and said second of said support sections contacting said carrier unloading belts and being displaced upward, thereby opening said carrier means and releasing the grip upon the item being transported.

8. Apparatus as defined in claim 7 further including a moving vacuum document removal belt positioned on one side of said carrier opener unloading belts and oriented transverse thereto, said vacuum removal belt contacting the document to be removed from said carrier means through said opening in said fixed side member and extracting the document, the openings in both said fixed side member and said movable side member providing clearance for said vacuum removal belt, said carrier means tongue-like element being disposed in the space between said carrier unloading opener belts to stabilize said carrier means in a vertical plane during the document removal process.

9. Apparatus as defined in claim 8 further including an information-bearing flag-like member affixed to and lying substantially in the same plane as said fixed side member of said carrier means.

10. Apparatus as defined in claim 9 further characterized in that said carrier means is constructed in one piece of a plastic-type semi-rigid material.

* * * * *